United States Patent
Ahn et al.

(10) Patent No.: US 11,345,985 B2
(45) Date of Patent: *May 31, 2022

(54) HIGH-STRENGTH STEEL SHEET WITH EXCELLENT CRASHWORTHINESS CHARACTERISTICS AND FORMABILITY AND METHOD OF MANUFACTURING THE SAME

(71) Applicant: POSCO, Pohang-si (KR)

(72) Inventors: Yeon-Sang Ahn, Gwangyang-si (KR); Chang-Hyo Seo, Gwangyang-si (KR); Kang-Hyun Choi, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,498

(22) Filed: Jul. 15, 2019

(65) Prior Publication Data

US 2019/0337267 A1 Nov. 7, 2019

Related U.S. Application Data

(63) Continuation-in-part of application No. PCT/KR2018/011679, filed on Oct. 2, 2018.

(30) Foreign Application Priority Data

Dec. 22, 2017 (KR) .......................... 10-2017-0177910

(51) Int. Cl.
*C21D 6/02* (2006.01)
*C22C 38/60* (2006.01)
(Continued)

(52) U.S. Cl.
CPC ............ *C22C 38/60* (2013.01); *B32B 15/013* (2013.01); *C21D 6/002* (2013.01); *C21D 6/005* (2013.01);
(Continued)

(58) Field of Classification Search
CPC ............ B32B 15/013; C21D 2211/001; C21D 2211/002; C21D 2211/005;
(Continued)

(56) References Cited

U.S. PATENT DOCUMENTS

| 6,517,955 B1 | 2/2003 | Takada et al. |
| 2011/0017363 A1* | 1/2011 | Kang ...................... C22C 38/32 148/534 |

(Continued)

FOREIGN PATENT DOCUMENTS

| CA | 2990356 | 1/2017 |
| CN | 1310770 | 8/2001 |

(Continued)

OTHER PUBLICATIONS

NPL: English on-line translation of KR 20130106142 A, Sep. 2013 (Year: 2013).*

(Continued)

*Primary Examiner* — Jie Yang
(74) *Attorney, Agent, or Firm* — Cantor Colburn LLP

(57) ABSTRACT

Provided is a high-strength steel sheet including, in % weight, carbon (C): 0.04 to 0.15%, silicon (Si): 0.01 to 1.0%, manganese (Mn): 1.8 to 2.5%, molybdenum (Mo): 0.15% or less (excluding 0%), chromium (Cr): 1.0% or less (excluding 0%), phosphorus (P): 0.1% or less, sulfur (S): 0.01% or less, aluminum (Al): 0.01 to 0.5%, nitrogen (N): 0.01% or less, boron (B): 0.01% or less (excluding 0%), antimony (Sb): 0.05% or less (excluding 0%), one or more of titanium (Ti): 0.003 to 0.06% and niobium (Nb): 0.003 to 0.06%, a balance of Fe and other unavoidable impurities, and contents of the C, the Si, the Al, the Mo and the Cr satisfy the following Expression 1: Expression 1: $\{(2\times(Si+Al))+Mo+Cr\}/C \geq 15$. The high-strength steel sheet comprises: a ferrite phase, a bainite phase, a martensite phase, and a residual (Continued)

austenite phase, the ferrite phase being less than 40% of area fraction in the microstructure.

8 Claims, 2 Drawing Sheets

(51) Int. Cl.

| | |
|---|---|
| C21D 6/00 | (2006.01) |
| C21D 8/02 | (2006.01) |
| C21D 9/46 | (2006.01) |
| C22C 38/00 | (2006.01) |
| C22C 38/02 | (2006.01) |
| C22C 38/06 | (2006.01) |
| C22C 38/22 | (2006.01) |
| C22C 38/26 | (2006.01) |
| C22C 38/28 | (2006.01) |
| C22C 38/32 | (2006.01) |
| C22C 38/38 | (2006.01) |
| C23C 2/02 | (2006.01) |
| C23C 2/06 | (2006.01) |
| C23C 2/28 | (2006.01) |
| C23C 2/40 | (2006.01) |
| B32B 15/01 | (2006.01) |

(52) U.S. Cl.
CPC ........... $C21D\ 6/008$ (2013.01); $C21D\ 8/0205$ (2013.01); $C21D\ 8/0226$ (2013.01); $C21D\ 8/0236$ (2013.01); $C21D\ 8/0263$ (2013.01); $C21D\ 9/46$ (2013.01); $C22C\ 38/001$ (2013.01); $C22C\ 38/002$ (2013.01); $C22C\ 38/02$ (2013.01); $C22C\ 38/06$ (2013.01); $C22C\ 38/22$ (2013.01); $C22C\ 38/26$ (2013.01); $C22C\ 38/28$ (2013.01); $C22C\ 38/32$ (2013.01); $C22C\ 38/38$ (2013.01); $C23C\ 2/02$ (2013.01); $C23C\ 2/06$ (2013.01); $C23C\ 2/28$ (2013.01); $C23C\ 2/40$ (2013.01); $C21D\ 2211/001$ (2013.01); $C21D\ 2211/002$ (2013.01); $C21D\ 2211/005$ (2013.01); $C21D\ 2211/008$ (2013.01)

(58) Field of Classification Search
CPC .. C21D 2211/008; C21D 8/0205; C21D 9/46; C22C 38/02; C23C 2/02; C23C 2/40
USPC ......................................................... 148/334
See application file for complete search history.

(56) References Cited

U.S. PATENT DOCUMENTS

| | | | |
|---|---|---|---|
| 2011/0168300 | A1 | 7/2011 | Moulin et al. |
| 2012/0040203 | A1 | 2/2012 | Takagi et al. |
| 2012/0282487 | A1 | 11/2012 | Ogawa et al. |
| 2016/0186282 | A1 | 6/2016 | Han et al. |
| 2016/0340755 | A1 | 11/2016 | Han |
| 2017/0260602 | A1 | 9/2017 | An et al. |
| 2019/0040511 | A1 | 2/2019 | Hasegawa et al. |
| 2019/0071746 | A1 | 3/2019 | Han et al. |
| 2019/0338403 | A1* | 11/2019 | Ahn ..................... C22C 38/60 |

FOREIGN PATENT DOCUMENTS

| | | |
|---|---|---|
| CN | 101910439 | 12/2010 |
| CN | 101960034 | 1/2011 |
| CN | 102046827 | 5/2011 |
| CN | 102414335 | 4/2012 |
| CN | 105734410 | 7/2016 |
| CN | 105734411 | 7/2016 |
| CN | 10602232 | 10/2016 |
| CN | 107164695 | 9/2017 |
| EP | 2123786 | 11/2009 |
| EP | 2256224 | 12/2010 |
| EP | 2426230 | 3/2012 |
| EP | 2559782 | 2/2013 |
| JP | 2528387 | 8/1996 |
| JP | 2005154872 | 6/2005 |
| JP | 2005264176 | 9/2005 |
| JP | 2009518541 | 5/2009 |
| JP | 2010090432 | 4/2010 |
| JP | 20102755628 | 12/2010 |
| JP | 2011508085 | 3/2011 |
| JP | 2011153368 | 8/2011 |
| JP | 4860782 | 1/2012 |
| JP | 5320681 | 10/2013 |
| JP | 2013234340 | 11/2013 |
| JP | 5865516 | 2/2016 |
| JP | 5958667 | 8/2016 |
| KR | 20110119285 | 11/2011 |
| KR | 20130074503 | 7/2013 |
| KR | 20130087616 | 8/2013 |
| KR | 20130106142 | 9/2013 |
| KR | 20140047960 | 4/2014 |
| KR | 20150073844 | 7/2015 |
| KR | 20160078570 | 7/2016 |
| KR | 16511498 | 7/2019 |
| WO | 2017131054 | 8/2017 |
| WO | 2017155263 | 9/2017 |

OTHER PUBLICATIONS

NPL: Pande et al, Impurities in commercial ferroalloys and its influence on the steel cleanliness, Applications and Uses, The twelfth international Ferroalloys congress, Jun. 2010, pp. 935-944 (Year: 2010).*
NPL: On-line English translation of CN 105734410 A, Jul. 2016 (Year: 2016).*
International Search Report—PCT/KR2018/011679 dated Jan. 23, 2019.
European Search Report—European Application No. 18890761.2 dated Aug. 17, 2020, citing EP 2256224, EP 2123786, US 2011/017363, US 2017/260602, EP 2426230, US 2016/186282, JP 5865516, KR 10-0711468, WO 2017/155263, CA 2990356, and EP 2559782.
Chinese Office Action—Chinese Application No. 201880082866.8 dated Mar. 19, 2021, citing CN 101960034, CN 101910439, KR 10-2013-0160142, CN 102046827, CN 102414335, CN 105734411, CN 106062232, CN 107164695, CN 1310770, and JP 2005-154872.
Japanese Office Action—Japanese Application No. 2020-529243 dated Jun. 1, 2021, citing JP 2010-275628, CN 105734410, JP 2011-508085, JP 2015-507094, WO 2017/131054, and JP 2009-51841.
Japanese Office Action—Japanese Application No. 2020-529243 dated Feb. 1, 2022, citing JP 4860782, JP 5320681, JP 2010-275628, CN 105734410, JP 2011-508085, JP 2015-507094, WO 2017/131054, and JP 2009-51841.

* cited by examiner

HIGH-STRENGTH STEEL SHEET WITH EXCELLENT CRASHWORTHINESS CHARACTERISTICS AND FORMABILITY AND METHOD OF MANUFACTURING THE SAME

TECHNICAL FIELD

The present invention relates to a high-strength steel sheet used for an automotive structural member, and more particularly, to a high-strength steel sheet with excellent crashworthiness characteristics and formability and a method for manufacturing the same.

BACKGROUND ART

In the automotive industry, regulations on carbon dioxide emissions as well as environmental and safety regulations have become increasingly severe, and fuel regulations for automobiles are also being tightened. In addition, the US Highway Safety Insurance Association is increasingly regulating collision safety to protect passengers, and requires severe crash performance, such as a 25% overlap from 2013 regulations.

Research to reduce the weight of automobiles as a means of solving the problems in the automobile industry is being carried out continuously.

Generally, high-strength automobile materials can be classified into a precipitation hardening steel, a bake hardenable steel, a solid solution strengthening steel, a transformed hardened steel, etc.

In the transformed hardened steel among them, dual phase steel (DP steel), transformation induced plasticity steel (TRIP steel), complex phase steel (CP steel) and the like are included. Such transformed hardened steel is called advanced high strength steel (AHSS).

DP steel is a steel in which hard martensite is finely and homogeneously dispersed in soft ferrite to ensure high strength. CP steel contains two or three phases of ferrite, martensite and bainite, and includes precipitation hardening elements such as Ti, Nb and the like to enhance strength. TRIP steel is a type of steel capable of securing high strength and high ductility, causing martensite transformation when remaining fine austenite, which is homogeneously dispersed, is processed at room temperature.

Meanwhile, recently, a steel sheet for automobiles has required even higher strength to improve fuel economy or durability. An ultra high-strength steel sheet having a tensile strength of 980 MPa or more is increasingly used for automobile body structures or a reinforcing material in aspects of collision safety and passenger protection.

Particularly, a high strength steel having excellent yield strength is used in a structural member such as a member, a seat rail, a pillar and the like for enhancing the crash resistance of the vehicle body. Such a structural member has characteristics favorable to impact energy absorption as the yield strength (YS) versus the tensile strength (TS), that is, the yield ratio (YS/TS), is high.

However, since ductility is usually reduced as the strength of the steel sheet is increased, there arises a problem is which forming processability is lowered.

Therefore, in order to secure both collision stability and component formability, it is necessary to develop a material having high yield strength and excellent ductility. Further, since most of the parts to be processed are subjected to bending, the application of a steel material having excellent bending performance is also required.

Therefore, in order to improve the crashworthiness characteristics and formability of high-strength steels, it is necessary to have low yield strength, improve bending performance and have excellent ductility like DP steel, the most widely used among the transformation-strengthening high strength steels, and the application of the high-strength steels may expand in various fields.

Meanwhile, water cooling is used during continuous annealing as a typical method for increasing yield strength. That is, steel may be cracked in the annealing process, immersed in water and tempered to obtain a steel sheet having a tempered martensite structure in which martensite is tempered as a microstructure.

As a conventional technique related thereto, Patent Document 1 discloses a method of continuously annealing a steel material containing carbon at 0.18% or more, and water-cooling to room temperature, and performing overaging treatment at a temperature of 120 to 300° C. for 1 to 15 minutes to obtain a volume fraction of martensite of 80 to 97%.

However, although this technique can increase a yield ratio, the shape quality of the coil is poor due to the temperature deviation in the width direction and the longitudinal direction of the steel sheet during water cooling, causing defects such as deterioration in workability such as the occurrence of cracks and the variation in material properties between different positions during forming.

As a technique of improving formability in high-tensile-steel sheets, Patent Document 2 discloses a steel sheet having a complex phase mainly containing martensite. That is, a method of producing a high-tensile steel sheet in which fine precipitated copper particles having a particle diameter of 1 to 100 nm are dispersed in a structure for improving processability is proposed.

However, this technique requires excessive addition of Cu in an amount of 2 to 5 wt % in order to precipitate fine Cu particles, and thus hot shortness due to Cu may occur, and manufacturing costs may rise excessively.

As still another example, Patent Document 3 discloses a steel sheet having a microstructure containing ferrite as a matrix and containing 2 to 10% by area of pearlite, and in which precipitation is strengthened by adding elements such as Nb, Ti, V or the like which are precipitation-strengthening elements, and having strength improved by grain refinement.

In this case, although the hole expandability of the steel sheet is good, there is a limit in increasing tensile strength, yield strength is high and ductility is low, which causes defects such as cracks during press forming.

As another example, Patent Document 4 discloses a cold-rolled steel sheet having high strength and high ductility simultaneously by utilizing a tempered martensite phase and also has a good plate shape after continuous annealing.

However, in this case, there is a problem in which the content of carbon (C) is as high as 0.2% or more, resulting in poor weldability and furnace dent defect due to the addition of a large amount of Si.

(Patent Document 1) Japanese Patent Laid-Open Publication No. 1992-289120

(Patent Document 2) Japanese Patent Laid-Open Publication No. 2005-264176

(Patent Document 3) Korean Patent Laid-Open Publication No. 2015-0073844

(Patent Document 4) Japanese Patent Laid-Open Publication No. 2010-090432

SUMMARY OF THE INVENTION

An aspect of the present invention provides a high-strength steel sheet having a tensile strength of 980 MPa or more, and more specifically, provides a high-strength steel sheet having low yield strength, high bending performance, excellent ductility and improved formability.

An aspect of the present invention provides a high-strength steel sheet with excellent crashworthiness characteristics and formability, including, in % by weight, carbon (C): 0.04 to 0.15%, silicon (Si): 0.01 to 1.0%, manganese (Mn): 1.8 to 2.5%, molybdenum (Mo): 0.15% or less (excluding 0%), chromium (Cr): 1.0% or less, phosphorus (P): 0.1% or less, sulfur (S): 0.01% or less, aluminum (Al): 0.01 to 0.5%, nitrogen (N): 0.01% or less, boron (B): 0.01% or less (excluding 0%), antimony (Sb): 0.05% or less (excluding 0%), one or more of titanium (Ti): 0.003 to 0.06% and niobium (Nb): 0.003 to 0.06%, a balance as Fe and other unavoidable impurities, and the relationship of C, Si, Al, Mo and Cr satisfies the following Expression 1, the high-strength steel sheet including a less than 40% area fraction of ferrite and the remainder as bainite, martensite and residual austenite, as a microstructure, wherein an area ratio (Fn/Ft) of non-recrystallized ferrite (Fn) in the total ferrite fraction (Ft) is 20% or less.

$$\{(2\times(Si+Al))+Mo+Cr\}/C\geq 15 \quad \text{Expression 1}$$

(Here, each element refers to a weight content.)

Another aspect of the present invention provides a method of producing a high-strength steel sheet with excellent crashworthiness characteristics and formability, comprising: reheating a steel slab satisfying the alloy composition and component relation (Expression 1) in a temperature range of 1050 to 1300° C., finishing hot-rolling the heated steel slab at a temperature equal to or higher than Ar3 to produce a hot-rolled steel sheet; coiling the hot-rolled steel sheet in a temperature range of 400 to 700° C.; producing a cold-rolled steel sheet by cold-rolling after the coiling; continuously annealing the cold-rolled steel sheet in a temperature range of Ac1+30° C. to Ac3-20° C.; primary cooling at a cooling rate of 10° C./s or less (excluding 0° C./s) up to 630 to 670° C. after the continuous annealing; secondary cooling at a cooling rate of 5° C./s or more up to 400 to 550° C. in hydrogen cooling equipment after the primary cooling; maintaining the temperature for 50 to 500 seconds after the secondary cooling; hot-dip galvanizing after the maintaining; and final-cooling at a cooling rate of 1° C./s or higher to Ms or lower after the hot-dip galvanizing, wherein the cold rolling is carried out at a total reduction ratio of 30% or more, and each of the reduction ratio of the first to fourth stands is 15% or more.

Advantageous Effects

According to the present invention, a high-strength steel sheet having improved crashworthiness characteristics and formability can be provided by optimizing the alloy composition and the manufacturing conditions.

Particularly, since impact resistance is excellent due to high yield strength, and excellent ductility and bending performance can prevent machining defects such as cracks during press forming, it can be suitably applied to parts or the like requiring processing into a complicated shape.

DETAILED DESCRIPTION OF THE INVENTION

Figure 1:
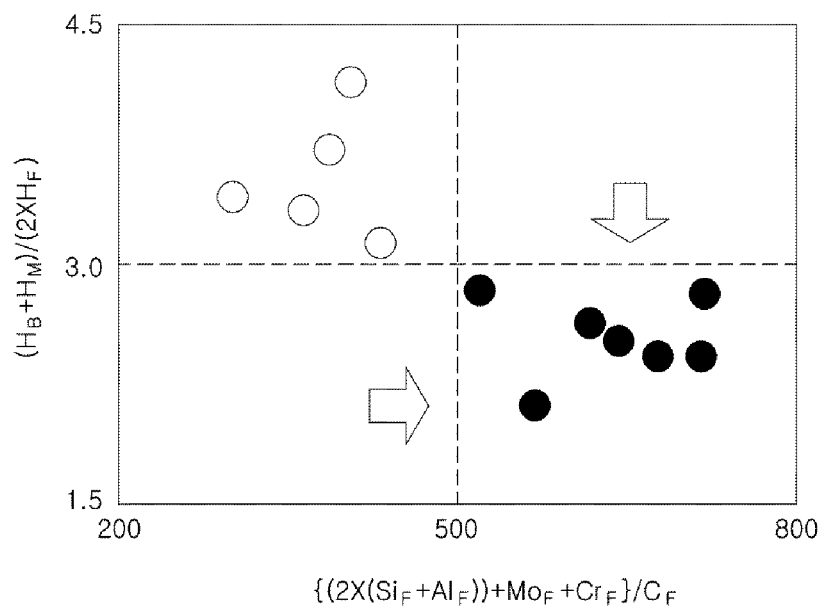
FIG. 1 shows a change in the interphase hardness ratio $[(H_B+H_M)/(2\times H_F)]$ according to a concentration ratio (corresponding to Expression 2) of Si, Al, Mo, Cr and C in a ferrite phase in an embodiment of the present invention.

The inventors of the present invention have conducted intensive studies to develop materials having excellent crashworthiness characteristics without causing defects such as cracks during processing into automotive materials having complex shapes.

As a result, it was confirmed that a high-strength steel sheet having a structure favorable for securing target physical properties can be provided by optimizing the alloy composition and the manufacturing conditions, and thereby the present invention has been accomplished.

In particular, the present invention has technical significance in that ferrite is included as a microstructure, and the concentration ratio of the solid solution strengthening element in the ferrite is increased to induce an increase in yield strength, the hardness ratio of bainite or martensite phase in a hard phase is reduced to improve bending processability.

In addition, the effect of inhibiting the grain growth can be obtained by the solid solution strengthening elements in the ferrite, and thus each phase is finely distributed, thereby relieving the local stress concentration and greatly improving ductility.

Hereinafter, the present invention will be described in detail.

Preferably, a high-strength steel sheet with excellent crashworthiness characteristics and formability according to an aspect of the present invention includes, in % by weight, carbon (C): 0.04 to 0.15%, silicon (Si): 0.01 to 1.0%, manganese (Mn): 1.8 to 2.5%, molybdenum (Mo): 0.15% or less (excluding 0%), chromium (Cr): 1.0% or less, phosphorus (P): 0.1% or less, sulfur (S): 0.01% or less, aluminum (Al): 0.01 to 0.5%, nitrogen (N): 0.01% or less, boron (B): 0.01% or less (excluding 0%), antimony (Sb): 0.05% or less (excluding 0%), one or more of titanium (Ti): 0.003 to 0.06% and niobium (Nb): 0.003 to 0.06%.

Hereinafter, the reason why the alloy composition of the high-strength steel sheet is controlled as described above will be described in detail. Here, unless otherwise specified, the content of each alloy composition is % by weight.

C: 0.04 to 0.15%

Carbon (C) is the main element added for strengthening the transformed structure of steel. The C improves the strength of the steel and promotes the formation of martensite in the complex phase steel. As the C content increases, the amount of martensite in the steel increases.

However, when the content of C exceeds 0.15%, the strength is increased due to an increase in the amount of martensite in the steel, but a difference in strength from ferrite having a relatively low carbon concentration is increased. Such a difference in strength causes a problem in which ductility and the work hardening rate are lowered because the fracture occurs easily at the interface between phases during the addition of stress. In addition, there is a problem in which welding defects are generated in the processing of the parts of the customer due to low weldability. On the other hand, when the content of C is less than 0.04%, it becomes difficult to secure desired strength.

Therefore, in the present invention, the content of C is preferably controlled to 0.04 to 0.15%, and more preferably 0.06 to 0.13%.

Si: 0.01 to 1.0%

Silicon (Si) is an element that stabilizes ferrite, and contributes to the formation of martensite by promoting ferrite transformation and promoting C concentration in untransformed austenite. In addition, it is an element which is effective for enhancing the strength of ferrite and reducing a phase hardness difference due to the high solid solution strengthening effect, and is effective for securing strength without lowering the ductility of the steel sheet.

For the above-mentioned effect, Si may be contained in an amount of 0.01% or more. However, when the content exceeds 1.0%, surface scale defects are caused, and the quality of the plated surface is poor and chemical treatment performance is deteriorated.

Therefore, in the present invention, it is preferable to control the Si content to 0.01 to 1.0%, and more preferably, the Si content may be in the range of 0.1 to 0.8%.

Mn: 1.8 to 2.5%

Manganese (Mn) has the effect of refining the particles without deterioration of ductility and precipitating sulfur (S) in steel as MnS to prevent hot shortness due to the formation of FeS. Further, the Mn is an element that strengthens the steel and serves to lower the critical cooling rate at which a martensite phase is obtained in complex phase steel, and is useful for forming martensite more easily.

When the content of Mn is less than 1.8%, not only can the above-mentioned effect not be obtained, but also it is also difficult to secure strength at the target level. On the other hand, when the content exceeds 2.5%, there is a high possibility that problems in weldability, hot rollability and the like are likely to occur, martensite is formed excessively so that the material is unstable, and a Mn-Band (Mn oxide band) is formed in the structure to increase the risk of the occurrence of processing cracks and plate breakage. Further, there is a problem in which Mn oxide is eluted on the surface during annealing and greatly deteriorates plating properties.

Therefore, in the present invention, it is preferable to control the Mn content to 1.8 to 2.5%, and more preferably, the Mn content may be in the range of 2.0 to 2.4%.

Mo: 0.15% or less (excluding 0%)

Molybdenum (Mo) is an element added to improve refinement of ferrite and strength while retarding transformation of austenite into pearlite. Such Mo may improve the hardenability of steel to finely form martensite in grain boundaries to enable the control of a yield ratio. However, since Mo is an expensive element, there is a disadvantage in terms of production of steel as the content of Mo is increased, and thus it is preferable to suitably control the content of Mo.

In order to fully obtain the above-described effect, Mo may be added in a maximum amount of 0.15%. When the content of Mo exceeds 0.15%, the cost of an alloy is rapidly increased and thus economic efficiency is lowered. Further, the ductility of steel may be deteriorated due to excessive grain refinement and solid solution strengthening effects.

Therefore, in the present invention, it is preferable to control the content of Mo to be 0.15% or less, but the content is not 0%.

Cr: 1.0% or less (excluding 0%)

Chromium (Cr) is an element added to improve the hardenability of steel and ensure high strength. Such Cr is effective for forming martensite and minimizes a decrease in ductility compared to an increase in strength, and thus it is advantageous for producing a complex phase steel having high ductility. Especially, it is a solid solution strengthening element contributing to the enhancement of the strength of ferrite.

In an aspect of the present invention, when the content of Cr exceeds 1.0%, the effect is saturated and hot rolling strength is excessively increased, thereby causing the cold rolling property to be poor. Further, there is a problem in which the fraction of the Cr-based carbide is increased and coarsened, and the size of the martensite is coarsened after annealing, thereby leading to a decrease in elongation.

Therefore, in the present invention, it is preferable to control the Cr content to be 1.0% or less, but the content is not 0%.

P: 0.1% or less

Phosphorus (P) is a substitutional element having the highest solid solution-strengthening effect, and is an element favorable for securing strength without improving in-plane anisotropy and greatly reducing formability. However, when such P is added excessively, the possibility of the occurrence of brittle fracturing greatly increases, so that the possibility of occurrence of plate breakage of the slab during hot rolling is increased, and the plated surface properties are deteriorated.

Therefore, in the present invention, it is preferable to control the P content to be 0.1% or less, but is not 0% because of the amount inevitably added.

S: 0.01% or less

Sulfur (S) is an element which is inevitably added as an impurity element in steel, and deteriorates ductility and weldability, and thus it is preferable to control the content to be as low as possible. Particularly, since S has a problem of increasing the possibility of generating hot shortness, it is preferable to control the content to 0.01% or less, but the content is not 0% because of the amount inevitably added.

Al: 0.01 to 0.5%

Aluminum (Al) is an element added for finer grain size and deoxidation of steel. Further, Al is a ferrite-stabilizing element, and is effective in distributing carbon in ferrite to austenite to improve the hardenability of martensite and is also effective in improving the ductility of the steel sheet by effectively suppressing the precipitation of carbides in bainite when being maintained in the bainite region.

It may be contained at 0.01% or more for the above-mentioned effect. When the content of Al exceeds 0.5%, it is advantageous in terms of strength improvement due to the grain refinement effect, but excess amounts of inclusions are formed during continuous casting in steelmaking, thereby increasing the possibility of surface defects in the plated steel sheet. Further, an increase in manufacturing costs is caused.

Therefore, in the present invention, the content of Al is preferably controlled to 0.01 to 0.5% or less.

N: 0.01% or less

Nitrogen (N) is an effective element for stabilizing austenite. However, when the content exceeds 0.01%, steel refining costs increase sharply, and the risk of cracking during continuous casting is greatly increased due to the formation of AlN precipitates.

Therefore, in the present invention, it is preferable to control the N content to be 0.01% or less, but the content is not 0% because of the amount inevitably added.

B: 0.01% or less (excluding 0%)

Boron (B) is an advantageous element for retarding transformation of austenite into pearlite in the process of cooling during annealing. Further, it is also a hardenable element that inhibits the formation of ferrite and promotes the formation of martensite.

When the content of B exceeds 0.01%, there is a problem in which an excess amount of B is concentrated on the surface, resulting in deterioration of plating adhesion.

Therefore, in the present invention, it is preferable to control the content of B to 0.01% or less, but the content is not 0%.

Sb: 0.05% or less (excluding 0%)

Antimony (Sb) is distributed in grain boundaries and serves to retard the diffusion of oxidizing elements such as Mn, Si, Al and the like through grain boundaries. Accordingly, the surface concentration of the oxide is suppressed and there is an advantageous effect in suppressing the coarsening of the surface agglomerates due to the temperature rise and a change in the hot rolling process.

When the content of Sb is more than 0.05%, the effect is saturated, manufacturing costs are increased, and processability is lowered.

Therefore, in the present invention, it is preferable to control the content of Sb to 0.05% or less, but the content is not 0%.

One or more of Titanium (Ti): 0.003 to 0.06% and niobium (Nb): 0.003 to 0.06%

Titanium (Ti) and niobium (Nb) are effective elements for increasing strength and grain refinement by forming fine precipitates. Specifically, the Ti and Nb bond with C in steel to form nanoscale fine precipitates, which serve to strengthen the matrix and decrease the phase hardness difference.

When the contents of Ti and Nb are less than 0.003%, respectively, the above-mentioned effect cannot be sufficiently ensured. On the other hand, when the contents of Ti and Nb are more than 0.06%, respectively, manufacturing costs increase and the precipitate is formed excessively, resulting in a decrease in ductility.

Therefore, in the present invention, the contents of Ti and Nb each are preferably controlled to 0.003 to 0.06%.

The remainder of the present invention is iron (Fe). However, impurities, which are not intended, may be inevitably added from the raw material or the surrounding environment in the common manufacturing process, and thus cannot be excluded. These impurities are not specifically mentioned in this specification, as they are commonly known to those skilled in the art.

Meanwhile, in order to have low yield strength as well as target high strength and to improve bending performance and ductility to ensure excellent formability in the present invention, the microstructure of the steel sheet is necessarily configured as follows.

Specifically, the high-strength steel sheet of the present invention may include less than 40% (excluding 0%) by area fraction of ferrite and the remainder as bainite, martensite and residual austenite, as a microstructure.

It is important to control the phase and the fraction for the complex phase steel including the soft phase and the hard phase combined to satisfy a low yield ratio and high ductility while securing excellent bending properties. It should be noted that, unless otherwise specified, the fraction of the phase is area % in the present invention.

In the present invention, the ferrite phase is contained at less than 40%, preferably, at 25% or more and less than 40%. Here, it is preferable that the area ratio (Fn/Ft) of the non-recrystallized ferrite (Fn) in the total fraction of ferrite (Ft) is 20% or less (including 0%). Here, when the area ratio (Fn/Ft) of the non-recrystallized ferrite exceeds 20%, strain and stress are locally concentrated, and thus ductility is poor.

In addition, in an aspect of the present invention, an effect of reducing the phase hardness difference between the soft phase and the hard phase can be obtained by containing a bainite phase in addition to a martensite phase as the hard phase.

The martensite phase and the bainite phase may be contained at 60% or more by area fraction, and the bainite phase may be contained at 10% or more by area fraction.

The balance other than the soft phase and the hard phase may include a residual austenite phase, and the residual austenite phase may be contained at such an extent that it does not affect the securement of the desired properties in the present invention. For example, the residual austenite phase may be contained at 5% or less (including 0%) by area fraction.

In an aspect of the present invention, the above-mentioned structure, that is, the structure in which the soft phase and the hard phase are uniformly formed, can be obtained by C, Si, Al, Mo and Cr in the above-mentioned alloy composition satisfying the following Expression 1 and controlling the manufacturing conditions to be described below.

$$\{(2\times(Si+Al))+Mo+Cr\}/C \geq 15 \qquad \text{Expression 1}$$

(Here, each element refers to a weight content.)

In Expression 1, Si and Al are ferrite-stabilizing elements and promote ferrite transformation, and Mo and Cr are elements contributing to the improvement of hardenability. On the other hand, C is an element contributing to the formation of martensite by promoting C concentration in untransformed austenite.

Thus, it is possible to obtain an effect of increasing the solid solution concentration of Si, Al, Mo and Cr in ferrite and enhancing the strength of ferrite by solid solution strengthening by controlling the ratio of the elements that affect stabilization of ferrite, improvements in hardenability, and the formation of martensite.

In the high-strength steel sheet of the present invention having the above-mentioned structure, the concentration ratio of Si, Al, Mo, Cr and C in the ferrite satisfies the following Expression 2, so that the phase hardness difference, that is, the hardness ratio of a martensite phase, a bainite phase and a ferrite phase may satisfy the following Expression 3.

$$\{(2\times(Si_F+Al_F))+Mo_F+Cr_F\}/C_F \geq 500 \qquad \text{Expression 2}$$

(Here, each element refers to a weight content)

$$(H_B+H_M)/(2\times H_F) \leq 3 \qquad \text{Expression 3}$$

(Here, B is bainite, M is martensite, and F is ferrite)

When the value of Expression 1 is less than 20, the effect of solid solution strengthening by Si, Al, Mo and Cr cannot be sufficiently obtained. Therefore, a concentration ratio (Expression 2) of Si, Al, Mo, Cr and C in the ferrite of 500 or more cannot be ensured. That is, the phase hardness difference is not effectively reduced, so that the hardness ratio $H_F$ of ferrite which is a soft phase, and the hardness ratio of bainite $H_B$ and martensite $H_M$ which are hard phases, cannot be ensured to be 3 or less.

The contents of Si, Al, Mo, Cr and C in the steel, the contents of Si, Al, Mo, Cr and C in the ferrite and the hardness value of each phase may be measured at the ¼t (Here, t is the thickness of the steel sheet) point in a thickness direction, but the present invention is not limited thereto.

The high-strength steel sheet of the present invention has the structure as described above, so that the phase hardness difference may be minimized, and local stress concentration may be alleviated by finely distributing each phase, and thereby ductility may be greatly improved.

Specifically, the high-strength steel sheet of the present invention may have a tensile strength of 980 MPa or more, a three-point bending angle may be 80 degrees or more, and a product (YS×El) of yield strength and elongation may be 10000 or more.

Further, the high strength steel sheet of the present invention may include a galvanized layer on at least one side.

Hereinafter, a method for manufacturing high-tensile steel having excellent processability according to another aspect of the present invention will be described in detail.

Briefly, the present invention can produce a target high-strength steel sheet through the processes of [reheating of steel slab—hot rolling—coiling—cold rolling—continuous annealing—cooling—hot galvanizing—cooling], and the conditions of each step will be described in detail as follows.

[Reheating of Steel Slab]

First, the steel slab having the above-mentioned component system is reheated. This step is performed in order to smoothly perform the subsequent hot rolling step and sufficiently obtain the target physical properties of the steel sheet. In the present invention, the process condition of the reheating process is not particularly limited, and may be common conditions. As an example, a reheating process may be performed in a temperature range of 1050 to 1300° C.

[Hot Rolling]

The steel slab heated as above may be finish hot rolled at a temperature of the Ar3 transformation point or higher, and the temperature at the outlet side preferably satisfies Ar3 to Ar3+50° C.

When the temperature at the outlet side during the finish hot rolling is less than Ar3, there may be a concern that performing ferrite and austenite two-phase rolling leads to non-uniformity of the material. On the other hand, when the temperature exceeds Ar3+50° C., non-uniformity of the material may be caused due to the formation of abnormal coarsened grains due to high-temperature rolling, thereby causing a coil twisting phenomenon during subsequent cooling.

Meanwhile, the temperature at the inlet side may be in the range of 800 to 1000° C. during the finish hot rolling.

[Coiling]

It is preferable to coiling the hot-rolled steel sheet produced as above.

The coiling is preferably performed in the temperature range of 400 to 700° C. When the coiling temperature is less than 400° C., an excessive increase in the strength of the hot-rolled steel sheet is caused due to the formation of an excessive amount of martensite or bainite, and thus there may arise a problem such as a shape defect due to a load in the subsequent cold rolling. On the other hand, when the coiling temperature exceeds 700° C., the surface concentration and internal oxidation of elements which decrease the wettability of hot-dip galvanized steel such as Si, Mn and B in the steel may be increased excessively.

[Cold Rolling]

The coiled hot-rolled steel sheet may be cold-rolled and produced as a cold-rolled steel sheet.

In an aspect of the present invention, it is preferable that the cold rolling is performed at a total reduction ratio of 30% or more, and the reduction ratios of the first to fourth stands of the cold rolling stands are each set to be 15% or more, preferably. For example, the number of the cold rolling stands may be six.

This cold rolling increases the stored energy in the steel to act as a driving force for promoting the recrystallization of ferrite in the subsequent annealing process, and may ultimately achieve the effect of reducing the fraction of the non-recrystallized ferrite. When an excess amount of the non-recrystallized ferrite phase is present in the steel, strain and stress are locally concentrated, thereby reducing ductility. On the other hand, the recrystallized ferrite phase alleviates strain and stress concentration to contribute to ductility improvement.

When the total reduction ratio during the cold rolling is less than 30%, or the reduction ratio of each of the first to fourth stands is less than 15%, it is difficult to secure a target thickness and to correct the shape of the steel sheet. Further, the fraction of the non-recrystallized ferrite is formed to exceed 20% of the total fraction of the ferrite phase, resulting in poor ductility.

[Continuous Annealing]

It is preferable to continuously anneal the cold-rolled steel sheet produced as above. The continuous annealing treatment may be performed, for example, in a continuous galvannealing line.

The continuous annealing step is a step for performing recrystallization, forming ferrite and austenite phases and decomposing carbon.

The continuous annealing treatment is preferably performed in the temperature range of Ac1+30° C. to Ac3−20° C., and more preferably in the temperature range of 780 to 820° C.

When the temperature is less than Ac1+30° C. during the continuous annealing, sufficient recrystallization cannot be achieved, and it is difficult to form sufficient austenite so that the target level of the martensite phase and bainite phase fraction cannot be secured after annealing. On the other hand, when the temperature exceeds Ac3−20° C., productivity is lowered, the austenite phase is excessively formed, the fractions of martensite and bainite phases are greatly increased after cooling, and thus it becomes difficult to secure desired ductility. Further, the surface concentration due to the elements such as Si, Mn, B and the like, which deteriorate the wettability of the hot-dip galvanizing becomes severe, and thus the quality of the plated surface may be lowered.

[Stepwise Cooling]

It is preferable that the cold-rolled steel sheet subjected to the continuous annealing treatment as above is cooled step-by-step.

Specifically, it is preferable that the cooling is primarily cooled up to 630 to 670° C. at an average cooling rate of 10° C./s or less (excluding 0° C./s), and then secondarily cooled up to 400 to 550° C. at an average cooling rate of 5° C./s or more.

When the stop temperature of the primary cooling is less than 630° C., the diffusion activity of carbon is low due to an excessively low temperature, and thus the concentration of carbon in ferrite becomes high and the yield ratio increases. Accordingly, the tendency of occurrence of cracks during processing increases. On the other hand, when the stop temperature of the primary cooling is higher than 670° C., it is advantageous in terms of diffusion of carbon, but it is disadvantageous that an excessively high cooling rate is required in the subsequent cooling (secondary cooling). In addition, when the average cooling rate during the primary cooling exceeds 10° C./s, the diffusion of carbon cannot sufficiently occur. Meanwhile, the lower limit of the average cooling rate is not particularly limited, but may be 1° C./s or more in consideration of productivity.

It is preferable to carry out the secondary cooling after completion of the primary cooling under the above conditions. When the stop temperature of the secondary cooling exceeds 550° C., the bainite phase cannot be sufficiently secured. Meanwhile, when the stop temperature of the secondary cooling is less than 400° C., the fraction of the martensite phase becomes excessive, and thus it is difficult to secure the desired ductility. Further, when the average cooling rate during the secondary cooling is less than 5° C./s, the bainite phase may not be formed at the target level. On the other hand, the upper limit of the average cooling rate is not particularly limited, and may be suitably selected by those skilled in the art in consideration of the specifications of the cooling equipment. For example, it may be performed at 100° C./s or lower.

In third cooling, hydrogen cooling equipment using hydrogen gas ($H_2$ gas) may be used. In this way, when cooling is performed using the hydrogen cooling equipment, it is possible to obtain an effect of suppressing surface oxidation that may occur in the tertiary cooling.

Meanwhile, in the stepwise cooling as above, the cooling rate at the time of the secondary cooling may be faster than the cooling rate at the time of the primary cooling.

[Maintaining]

It is preferable that the temperature is maintained for 50 to 500 seconds in the cooled temperature range after completing the stepwise cooling as described above.

When the maintaining time is less than 50 seconds, the bainite phase may not be sufficiently formed. On the other hand, when the maintaining time exceeds 500 seconds, an excess amount of the bainite phase is formed and thus it may be difficult to secure the target microstructure.

[Hot-Dip Galvanizing]

It is preferable that the steel sheet is immersed in a hot-dip galvanizing bath after the stepwise cooling and maintaining processes as above to produce a hot-dip galvanized steel sheet.

Here, although the hot-dip galvanizing may be carried out under common conditions, it may be carried out in the temperature range of 430 to 490° C., for example. The composition of the hot-dip galvanizing bath during the hot-dip galvanizing is not particularly limited, and may be a pure galvanizing bath or a zinc-based alloy plating bath containing Si, Al, Mg, or the like.

[Final Cooling]

After the completion of the hot-dip galvanizing, it is preferable to cool the steel sheet at a cooling rate of 1° C./s or more to a martensitic transformation start temperature (Ms) or lower. In this process, the martensite phase and the residual austenite phase may be formed in the steel sheet (the steel sheet corresponds to the base material of the lower part of the plated layer).

When the stop temperature of the cooling exceeds Ms, the martensite phase cannot be sufficiently secured. When the average cooling rate is less than 1° C./s, the martensite phase is unevenly formed due to an excessively slow cooling rate. More preferably, the cooling may be performed at a cooling rate of 1 to 100° C./s.

Even when the steel sheet is cooled to room temperature during the cooling, there is no problem in securing the target structure, and the room temperature may be expressed as about 10 to 35° C.

Meanwhile, if necessary, the hot-dip galvanized steel sheet may be subjected to alloying heat treatment before the final cooling to obtain a hot-dip galvannealed steel sheet. In the present invention, the process conditions of the alloying heat treatment are not particularly limited, and may be common conditions. As an example, the alloying heat treatment may be performed at a temperature of 480 to 600° C.

Next, if necessary, the hot-dip galvanized steel sheet or the hot-dip galvannealed steel sheet finally cooled is subject to temper rolling to form large amounts of dislocations in ferrite disposed around martensite, thereby further improving bake hardenability.

Here, a reduction ratio is preferably less than 1.0% (excluding 0%). When the reduction ratio is 1.0% or more, it is advantageous in terms of formation of dislocation, but it may cause side effects such as occurrence of plate breakage due to an equipment capability limit.

The high-strength steel sheet of the present invention produced as above includes a mixture of a hard phase and a soft phase as a microstructure, and specifically may include ferrite having an area fraction of less than 40%, and the remainder as bainite, martensite and residual austenite.

Here, the concentration of the solid solution elements in the ferrite may be increased to improve strength and implement grain refinement, thereby minimizing the difference in hardness between the soft phase and the hard phase. Further, there is an effect of providing a high-strength steel sheet having excellent bending properties and formability by improving ductility in addition to high yield strength.

Hereinafter, the present disclosure will be described more specifically according to examples. However, the following examples should be considered in a descriptive sense only and not for purposes of limitation. The scope of the present invention is defined by the appended claims, and modifications and variations may reasonably made therefrom.

EXAMPLES

After a steel slab having the alloy composition shown in the following Table 1 was prepared, the steel slab was heated to a temperature range of 1050 to 1250° C., and then subjected to hot rolling, cooling and coiling under the conditions shown in the following Table 2 to prepare a hot rolled steel sheet.

Thereafter, each hot-rolled steel sheet was cold-rolled to produce a cold-rolled steel sheet, which was subjected to continuous annealing treatment under the conditions shown in the following Table 2, followed by stepwise cooling (primary and secondary) and maintained at the secondary cooling stop temperature for 50 to 500 seconds. Here, the secondary cooling was performed using hydrogen cooling equipment.

Thereafter, the steel sheet was galvanized at 430 to 490° C. in a hot-dip galvanizing bath (0.1 to 0.3% Al-remainder Zn), and then subjected to final cooling at a cooling rate of 1° C./s or more up to Ms or less and subjected to temper rolling at 0.2% to produce a hot-dip galvanized steel sheet.

The microstructure of each steel sheet manufactured above was observed, and mechanical properties and plating characteristics were evaluated. The results are shown in the following Table 3.

Here, the tensile test for each test piece was performed in the L direction using the ASTM standard. The bending angle (180 degrees-bending angle) was evaluated by applying the German Association of the Automotive Industry (VDA) 238-100 standard for the three-point bending test. The larger the bending angle, the more excellent the bending property.

Further, the microstructure fraction was assessed by analyzing a matrix at a point of ¼t of the thickness of the steel sheet. Specifically, the fractions of ferrite, bainite, martensite and austenite were measured by FE-SEM and an image analyzer after Nital corrosion.

The concentrations of C, Si, Al, Mo, and Cr in the ferrite at a point of ¼t of each steel sheet were measured using transmission electron microscopy (TEM), energy dispersive spectroscopy (EDS), and ELLS analysis equipment.

Further, the hardness of each phase was measured ten times using a Micro Vickers hardness tester, and then an average value was obtained.

TABLE 1

| Classification | Alloy composition (wt %) | | | | | | | | | | | | | Composition ratio |
|---|---|---|---|---|---|---|---|---|---|---|---|---|---|---|
| | C | Si | Mn | P | S | Al | Mo | Cr | Ti | Nb | N | B | Sb | |
| Inventive steel 1 | 0.07 | 0.4 | 2.35 | 0.02 | 0.003 | 0.04 | 0.12 | 0.85 | 0.02 | 0.025 | 0.005 | 0.0025 | 0.03 | 26.4 |
| Inventive steel 2 | 0.09 | 0.3 | 2.4 | 0.01 | 0.005 | 0.40 | 0.10 | 0.65 | 0.022 | 0.034 | 0.003 | 0.0003 | 0.03 | 23.9 |
| Inventive steel 3 | 0.08 | 0.5 | 2.4 | 0.009 | 0.004 | 0.06 | 0.09 | 0.71 | 0.04 | 0.03 | 0.004 | 0.0025 | 0.01 | 24.0 |
| Inventive steel 4 | 0.10 | 0.6 | 2.3 | 0.01 | 0.003 | 0.07 | 0.12 | 0.68 | 0.03 | 0.02 | 0.0056 | 0.0025 | 0.02 | 21.4 |
| Inventive steel 5 | 0.06 | 0.4 | 2.2 | 0.01 | 0.003 | 0.05 | 0.15 | 0.65 | 0.02 | 0.03 | 0.005 | 0.0011 | 0.03 | 28.3 |
| Inventive steel 6 | 0.07 | 0.4 | 2.2 | 0.01 | 0.003 | 0.04 | 0.07 | 0.60 | 0.025 | 0.02 | 0.0047 | 0.0005 | 0.02 | 22.1 |
| Inventive steel 7 | 0.13 | 0.6 | 2.2 | 0.01 | 0.003 | 0.06 | 0.13 | 0.71 | 0.03 | 0.02 | 0.005 | 0.0020 | 0.02 | 16.6 |
| Comparative steel 1 | 0.10 | 0.1 | 2.5 | 0.02 | 0.002 | 0.035 | 0.07 | 0.95 | 0.02 | 0.05 | 0.005 | 0.0025 | 0.02 | 12.9 |
| Comparative steel 2 | 0.06 | 0.4 | 2.9 | 0.02 | 0.002 | 0.03 | 0.01 | 0.02 | 0.03 | 0.02 | 0.005 | 0.0010 | 0.01 | 14.8 |
| Comparative steel 3 | 0.07 | 0.2 | 2.5 | 0.02 | 0.002 | 0.30 | 0.04 | 0.04 | 0.015 | 0.02 | 0.005 | 0.0014 | 0.01 | 15.4 |
| Comparative steel 4 | 0.09 | 0.2 | 2.7 | 0.01 | 0.003 | 0.10 | 0.01 | 0.60 | 0.03 | 0.02 | 0.0056 | 0.0025 | 0.02 | 13.4 |
| Comparative steel 5 | 0.15 | 0.3 | 2.5 | 0.01 | 0.003 | 0.04 | 0.07 | 0.40 | 0.025 | 0.02 | 0.0047 | 0.0005 | 0.02 | 7.7 |

(In Table 1, the composition ratios are the values of Expression 1[{(2×(Si+Al))+Mo+Cr}/C] of each steel.)

TABLE 2

| Classification | Temperature at outlet side (° C.) | Coiling temperature (° C.) | Cold rolling (%) | | Annealing temperature (° C.) | Primary cooling | | Secondary cooling | |
|---|---|---|---|---|---|---|---|---|---|
| | | | Total reduction ratio | Reduction ratio of First to forth stands | | Rate (° C./s) | Temperature (° C./s) | Rate (° C./s) | Temperature (° C./s) |
| Inventive steel 1 | 920 | 650 | 70 | 15 or more | 810 | 3.0 | 630 | 7.1 | 520 |
| Inventive steel 2 | 911 | 600 | 68 | 15 or more | 790 | 2.9 | 652 | 8.9 | 530 |
| Inventive steel 3 | 907 | 580 | 61 | 15 or more | 820 | 4.0 | 649 | 10.7 | 500 |
| Inventive steel 4 | 905 | 629 | 80 | 15 or more | 790 | 3.8 | 664 | 13.2 | 480 |
| Inventive steel 5 | 915 | 647 | 71 | 15 or more | 800 | 5.2 | 645 | 15.1 | 420 |
| Inventive steel 6 | 900 | 680 | 64 | 15 or more | 810 | 7.1 | 670 | 12.5 | 480 |
| Inventive steel 7 | 905 | 630 | 78 | 15 or more | 800 | 4.0 | 650 | 12.0 | 450 |
| Comparative steel 1 | 800 | 400 | 63 | 15 or more | 780 | 10.4 | 650 | 5.1 | 580 |
| Comparative steel 2 | 830 | 650 | 65 | 15 or more | 790 | 4.4 | 590 | 5.0 | 520 |
| Comparative steel 3 | 900 | 716 | 28 | 10 or less | 810 | 5.7 | 630 | 7.2 | 520 |
| Comparative steel 4 | 916 | 615 | 71 | 15 or more | 820 | 2.0 | 630 | 10.2 | 450 |
| Comparative steel 5 | 770 | 350 | 25 | 10 or less | 850 | 8.1 | 530 | 15.1 | 300 |

TABLE 3

| | Microstructure (%) | | | Mechanical properties | | | | | | | |
|---|---|---|---|---|---|---|---|---|---|---|---|
| Classification | F | B + M | Fn/Ft | YS (MPa) | TS (MPa) | El (%) | YR | YS × El (MPa %) | Three-point bending angle (degree) | Hardness ratio | Concentration ratio |
| Inventive steel 1 | 34 | 66 | 0 | 719 | 1040 | 15 | 0.69 | 10785 | 91 | 2.6 | 617 |
| Inventive steel 2 | 31 | 69 | 0 | 751 | 1038 | 15 | 0.72 | 11265 | 95 | 2.8 | 717 |
| Inventive steel 3 | 35 | 65 | 0 | 748 | 1039 | 16 | 0.72 | 11968 | 87 | 2.5 | 640 |
| Inventive steel 4 | 37 | 63 | 0 | 701 | 1016 | 17 | 0.69 | 11917 | 95 | 2.4 | 713 |
| Inventive steel 5 | 29 | 71 | 0 | 718 | 1017 | 15 | 0.71 | 10770 | 89 | 2.1 | 567 |
| Inventive steel 6 | 33 | 67 | 0 | 736 | 1055 | 15 | 0.70 | 11040 | 85 | 2.8 | 517 |
| Inventive steel 7 | 36 | 64 | 0 | 735 | 1027 | 16 | 0.72 | 11760 | 89 | 2.4 | 670 |
| Comparative steel 1 | 43 | 57 | 0 | 640 | 1070 | 15 | 0.62 | 9600 | 67 | 3.1 | 430 |
| Comparative steel 2 | 46 | 54 | 0 | 666 | 999 | 13 | 0.67 | 8658 | 73 | 3.4 | 297 |
| Comparative steel 3 | 35 | 65 | 21 | 750 | 1005 | 12 | 0.71 | 9000 | 78 | 3.3 | 360 |
| Comparative steel 4 | 45 | 55 | 0 | 699 | 1014 | 12 | 0.69 | 8388 | 69 | 4.1 | 403 |
| Comparative steel 5 | 24 | 76 | 34 | 838 | 1105 | 11 | 0.76 | 9218 | 63 | 3.7 | 383 |

(In Table 3, F is a ferrite phase, B is a bainite phase, and M is a martensite phase. In addition, YS is yield strength, TS is tensile strength, El is elongation, and YR is yield ratio. The concentration ratio is calculated by Expression 2[$\{(2\times(Si_F+Al_F))+Mo_F+Cr_F\}/C_F$], and the hardness ratio is calculated by Expression 3[$(H_B+H_M)/(2\times H_F)$]).

As shown in Tables 1 to 3, since the intended microstructure was formed, inventive steels 1 to 7, in which the steel alloy composition, the composition ratio (Expression 1), and the manufacturing conditions satisfy all the requirements of the present invention, have a three-point bending angle of 80 degrees or more, and a product of yield strength and elongation (YS×El) of 10000 or more, and thus crashworthiness and formability can be secured.

On the other hand, comparative steels 1 to 5, in which one or more of the conditions of the steel alloy composition, the composition ratio and the manufacturing conditions deviate from those proposed in the present invention, fail to obtain the intended microstructure in the present invention, bending properties are deteriorated, and a product of yield strength and elongation (YS×El) of less than 10000 was secured, so that crashworthiness and formability could not be ensured.

FIG. 1 shows a change in the interphase hardness ratio [$(H_B+H_M)/(2\times H_F)$] according to a concentration ratio (corresponding to Expression 2) of Si, Al, Mo, Cr and C in a ferrite phase.

As shown in FIG. 1, it can be seen that when a concentration ratio between Si, Al, Mo, Cr, and C in the ferrite phase of 500 or more is secured, the difference in hardness between phases can be effectively reduced.

Figure 2:
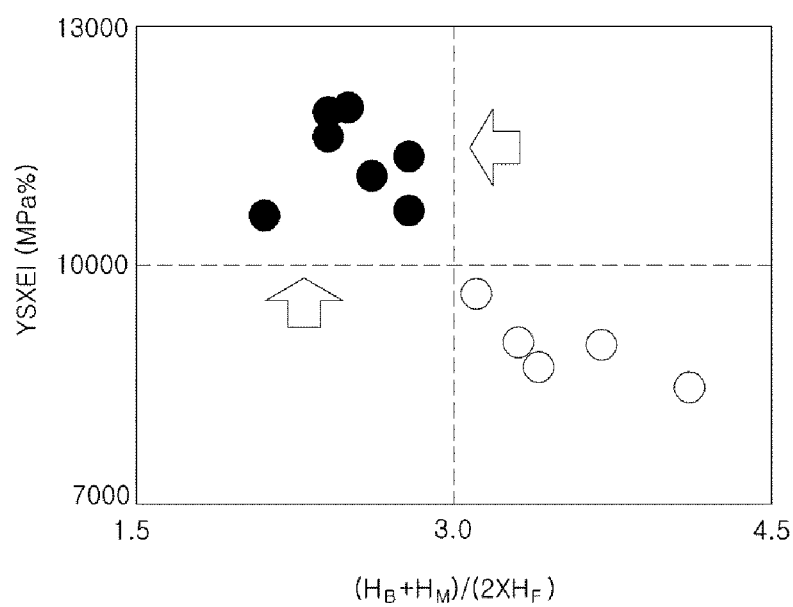
FIG. 2 shows a change in the product of yield strength and elongation (YS×El) according to the interphase hardness ratio $[(H_B+H_M)/(2\times H_F)]$ in an embodiment of the present invention.

FIG. 2 shows a change in the product of yield strength and elongation (YS×El) according to the interphase hardness ratio [$(H_B+H_M)/(2\times H_F)$].

As shown in FIG. 2, it can be seen that when the interphase hardness ratio is 3 or less, a product of yield strength and elongation (YS×El) of 10000 or more can be secured.

Figure 3:
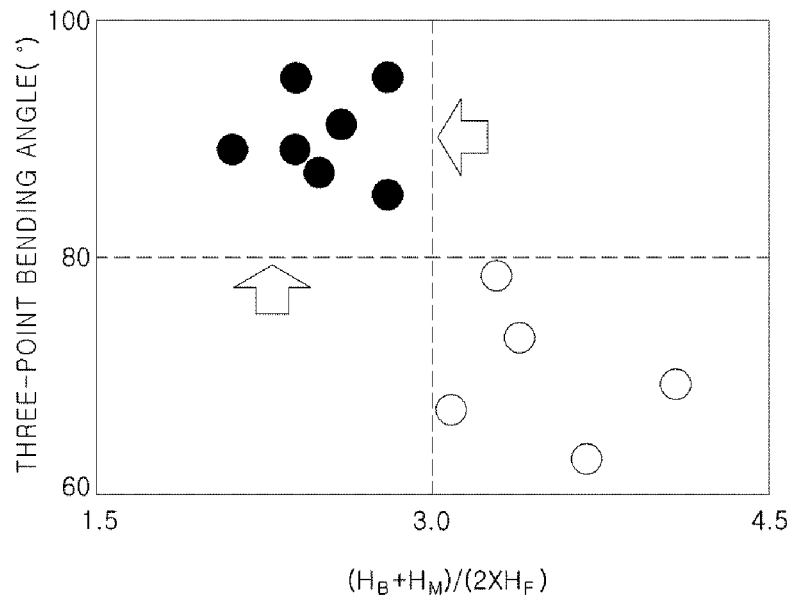
FIG. 3 shows a change in a three-point bending angle according to the interphase hardness ratio $[(H_B+H_M)/(2\times H_F)]$ in an embodiment of the present invention.

FIG. 3 shows a change in a three-point bending angle according to the interphase hardness ratio [$(H_B+H_M)/(2\times H_F)$].

As shown in FIG. 3, it can be seen that when the interphase hardness ratio is 3 or less, a three-point bending angle of 80 degree or more can be secured.

Figure 4:
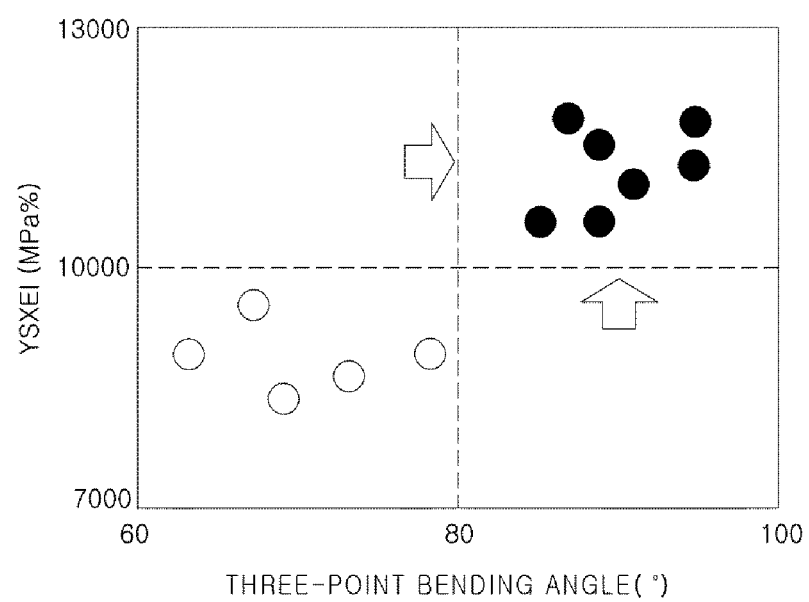
FIG. 4 shows a change in a three-point bending angle according to the product of yield strength and elongation (YS×El) in an embodiment of the present invention.

FIG. 4 shows a change in a three-point bending angle according to the product of yield strength and elongation (YS×El).

As shown in FIG. 4, it can be seen that when the value of the relationship between the yield strength and elongation (YS×El) is 10000 or more, a three-point bending angle of 80 degrees or more can be secured.

What is claimed is:

1. A steel sheet comprising, in % weight, carbon (C): 0.04 to 0.15%, silicon (Si): 0.01 to 0.6%, manganese (Mn): 1.8 to 2.5%, molybdenum (Mo): 0.15% or less (excluding 0%), chromium (Cr): 1.0% or less (excluding 0%), phosphorus (P): 0.1% or less, sulfur (S): 0.01% or less, aluminum (Al): 0.01 to 0.5%, nitrogen (N): 0.01% or less, boron (B): 0.01% or less (excluding 0%), antimony (Sb): 0.01 to 0.05%, one or more of titanium (Ti): 0.003 to 0.06% and niobium (Nb): 0.003 to 0.06%, a balance of Fe and other unavoidable impurities, and contents of the C, the Si, the Al, the Mo and the Cr satisfying the following Expression 1 and contents of the Si, the Al, the Mo, the Cr and the C in the ferrite phase satisfy the following Expression 2:

Expression 1
$\{(2\times(Si+Al))+Mo+Cr\}/C \geq 15$ (where Si refers to a content of the Si in % weight, Al refers to a content of the Al in % weight, Mo refers to a content of the Mo in % weight, Cr refers to a content of the Cr in % weight, and C refers to a content of the C in % weight), Expression 2
$\{(2\times(Si_F+Al_F))+Mo_F+Cr_F\}/C_F \geq 500$ (where $Si_F$ refers to a content of the Si in % weight, $Al_F$ refers to a content of the Al in % weight, $Mo_F$ refers to a content of the Mo in % weight, $Cr_F$ refers to a content of the Cr in % weight, and $C_F$ refers to a content of the C in % weight), wherein the steel sheet comprises: a microstructure including a ferrite phase, a bainite phase, a martensite phase, and a residual austenite phase, the ferrite phase being 31% to 40% of area fraction in the microstructure, and wherein an area ratio (Fn/Ft) of non-recrystallized ferrite (Fn) in the ferrite phase (Ft) is 20% or less (including 0%).

2. The steel sheet of claim 1, wherein a hardness ratio of the martensite phase, the bainite phase and the ferrite phase satisfies the following Expression 3:

Expression 3

$(H_B+H_M)/(2 \times H_F) \leq 3$ (where $H_B$ refers to a hardness of bainite phase, $H_M$ refers to a hardness of martensite phase, and $H_F$ refers to a hardness of ferrite phase).

3. The steel sheet of claim 1, wherein the steel sheet further comprises: a hot dipped galvanized layer formed on at least one surface thereof.

4. The steel sheet of claim 1, wherein the steel sheet has a tensile strength of 980 MPa or more, a three-point bending angle is 80 degrees or more, and a product (YSxEl) of yield strength and elongation is 10000 or more.

5. A steel sheet comprising, in % weight, carbon (C): 0.04 to 0.15%, silicon (Si): 0.01 to 0.6%, manganese (Mn): 1.8 to 2.5%, molybdenum (Mo): 0.15% or less (excluding 0%), chromium (Cr): 1.0% or less (excluding 0%), phosphorus (P): 0.1% or less, sulfur (S): 0.01% or less, aluminum (Al): 0.01 to 0.5%, nitrogen (N): 0.01% or less, boron (B): 0.01% or less (excluding 0%), antimony (Sb): 0.01 to 0.05%, one or more of titanium (Ti): 0.003 to 0.06% and niobium (Nb): 0.003 to 0.06%, a balance of Fe and other unavoidable impurities, and contents of the C, the Si, the Al, the Mo and the Cr satisfying the following Expression 1:

Expression 1

${(2 \times (Si+Al))+Mo+Cr}/C \geq 15$ (where Si refers to a content of the Si in % weight, Al refers to a content of the Al in % weight, Mo refers to a content of the Mo in % weight, Cr refers to a content of the Cr in % weight, and C refers to a content of the C in % weight), wherein the steel sheet comprises: a microstructure including a ferrite phase, a bainite phase, a martensite phase, and a residual austenite phase, the ferrite phase being 31% to 40% of area fraction in the microstructure, and wherein contents of the Si, the Al, the Mo, the Cr and the C in the ferrite phase satisfy the following Expression 2:

Expression 2

${(2 \times (Si_F+Al_F))+Mo_F+Cr_F}C_F \geq 500$ (where $Si_F$ refers to a content of the Si in % weight, $Al_F$ refers to a content of the Al in % weight, $Mo_F$ refers to a content of the Mo in % weight, $Cr_F$ refers to a content of the Cr in % weight, and $C_F$ refers to a content of the C in % weight).

6. The steel sheet of claim 5, wherein a hardness ratio of the martensite phase, the bainite phase and the ferrite phase satisfies the following Expression 3:

Expression 3

$(H_B+H_M)/(2 \times H_F) \leq 3$ (where $H_B$ refers to a hardness of bainite phase, $H_M$ refers to a hardness of martensite phase, and $H_F$ refers to a hardness of ferrite phase).

7. The steel sheet of claim 5, wherein the steel sheet further comprises: a hot dipped galvanized layer formed on at least one surface thereof.

8. The steel sheet of claim 5, wherein the steel sheet has a tensile strength of 980 MPa or more, a three-point bending angle is 80 degrees or more, and a product (YSxEl) of yield strength and elongation is 10000 or more.

* * * * *